Oct. 16, 1956  W. W. BUERER ET AL  2,766,580
GAS TURBINE APPARATUS

Filed July 22, 1952  2 Sheets-Sheet 1

INVENTORS:
WAYNE W. BUERER
ROBERT A. NEAL
BY
Ralph T. French
ATTORNEY

United States Patent Office 2,766,580
Patented Oct. 16, 1956

2,766,580

GAS TURBINE APPARATUS

Wayne W. Buerer, and Robert A. Neal, Media, Pa., assignors to Westinghouse Electric Corporation, East Pittsburgh, Pa., a corporation of Pennsylvania Application July 22, 1952, Serial No. 300,192

7 Claims. (Cl. 60—35.6)

This invention relates to gas turbine power plants, particularly to control apparatus for an aviation turbojet, and has for an object the provision of improved means for effecting acceleration of such a power plant.

It has heretofore been the practice, in effecting an acceleration of a turbojet engine, to employ an electronic device to control or to limit the maximum turbine outlet temperature. The fuel required incident to acceleration of the turbojet to afford maximum allowable turbine outlet temperature, however, may sometimes be more than enough to cause compressor stall. In order to avoid this undesirable consequence, it has been proposed to modify the electronic control to graduate the acceleration operation or to control the metering of fuel at such a rate as to skirt around operating conditions tending to induce compressor stall. Modifications of the electronic control heretofore attempted have resulted in the requirement of time intervals of 15 to 20 seconds for acceleration of the engine from idle speed to maximum power. An acceleration time interval of this length is considered excessive for flight service. It is another object of the invention, therefore, to provide improved control apparatus for a turbojet power plant by means of which acceleration from idle to maximum power may be accomplished in a relatively short interval of time, such as 5 to 7 seconds, without inducing compressor stall or creating overtemperature conditions in the engine.

A further object of the invention is the provision of improved control apparatus of the foregoing description which may readily be installed in either an existing power plant or in one of advanced design.

In a fluid pressure control system currently employed on well-known turbojet apparatus equipped with a variable area exhaust nozzle, a pressure-responsive acceleration control valve is utilized for limiting the rate of fuel supply in accordance with variations in the inlet total pressure of the usual compressor. It is another object of the present invention to provide an improved acceleration control constructed and arranged first to provide sufficient fuel to effect rapid acceleration from idle speed to maximum with the exhaust nozzle open, without inducing stalling of the compressor, and then to effect simultaneous closure of the nozzle and increase in the rate of fuel supply to a value sufficient to continue operation of the engine with the nozzle closed.

Still another object is to provide, in a turbojet power plant equipped as just described, improved acceleration control means adapted to respond to compressor inlet pressure for determining fuel flow with the engine operating in one speed range, and adapted to respond to compressor discharge pressure for increasing the available fuel flow when a higher engine speed is attained, coincident with reduction of the flow area of the engine exhaust nozzle, for thereby effecting rapid acceleration without inducing compressor stall or over-temperature conditions in the engine.

These and other objects are effected by the invention as will be apparent from the following description taken in connection with the accompanying drawings, forming a part of this application, in which.

Figure 1:
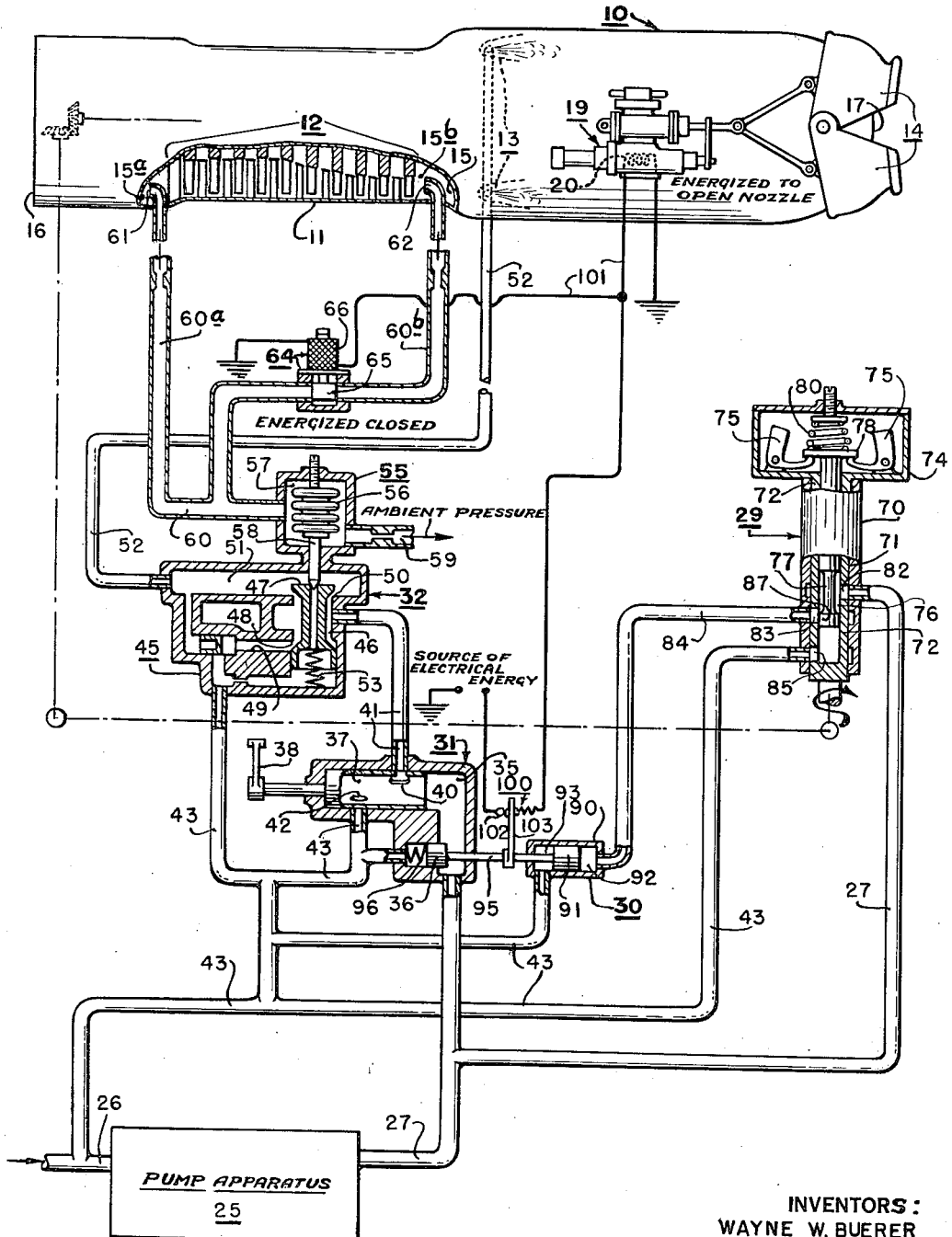
Fig. 1 is a schematic partially sectional view of a typical aviation gas turbine power plant having associated therewith control apparatus constructed in accordance with the invention.

As shown in Fig. 1 of the drawings, a conventional aviation gas turbine power plant or turbojet 10 may comprise elongated casing structure 11 in which are axially aligned the usual components of such an engine including an axial-flow compressor 12, combustion apparatus 13, a turbine (not shown) which is operatively connected to the compressor, and variable area exhaust nozzle apparatus 14. The casing structure and components therein are arranged to provide a continuous axial-flow passageway, indicated generally at 15, which extends from a forwardly disposed air inlet opening 16 to an exhaust nozzle opening 17, the flow area of which is varied by operation of the variable area nozzle apparatus 14. Reference characters 15a and 15b indicate, respectively, the compressor inlet and outlet. For convenience, the variable area nozzle apparatus 14 may be said to be open when the area of the nozzle opening is about a maximum, and to be closed when the nozzle flow area is reduced or relatively restricted. Also carried on the casing structure 11 is an electro-responsive hydraulically motivated actuator mechanism 19, which is operatively connected to the variable area nozzle apparatus 14. This actuator mechanism is illustrated in outline form only, since the structural details thereof may be of any well-known design, such as that disclosed in the copending application of Cyrus F. Wood, Serial No. 121,171, now Patent No. 2,734,340, filed October 13, 1949, and assigned to the assignee of the present invention. It will be understood that the actuator mechanism includes an electro-responsive coil 20, which when energized effects operation of the mechanism to hold open the variable area nozzle apparatus 14, and which may be deenergized to cause the actuator mechanism to close the nozzle apparatus.

Associated with the turbojet engine 10 is a control system which may comprise fuel pump apparatus 25 communicating with a source of fuel (not shown) by way of a fuel inlet pipe 26 and adapted to deliver fuel under pressure by way of a fuel supply pipe or passage 27, an engine-driven speed-responsive control valve device 29, an overspeed control device 30, a throttle valve device 31, and an air pressure-responsive acceleration control valve device 32. The pump apparatus may be of any suitable construction and is operative in a conventional manner, as by means of the engine 10 through the medium of a driving connection (not shown), to deliver fuel under pressure through the fuel supply pipe 27 to a passage 35 that is formed in the casing of the throttle valve device 31.

Interposed in the passage 35 is a spring-pressed overspeed valve 36, hereinafter more fully described, and a rotary throttle valve 37 having an operating element 38. The throttle valve 37 has a fuel feed port 40 adapted for variable registration with a passage or pipe 41, and also has a by-pass port 42 which may be brought into registration with a return passage or pipe 43 leading to the pump inlet pipe 26. Rotation of the valve 37 by the operating element 38 in one direction effects increase in feeding of fuel through the port 40 to pipe 41, while rotation in the opposite direction effects reduction in this fuel feed and by-passing of fuel by way of the port 42 to pipe 43.

The acceleration control valve device 32 comprises a casing section 45 having formed therein a valve bore 46 communicating with the pipe 41 and containing a double-seat valve 47 of a balanced type, which on movement in one direction is engageable with a seat 48 for controlling flow from the bore through a by-pass 49 to the return pipe 43. On movement away from seat 48 the double-seat valve 47 is engageable with a seat 50 for controlling the flow of fuel from the bore 46 through a chamber 51 to a pipe 52 leading to the usual fuel nozzles (not shown) of the combustion apparatus 13. A biasing spring 53 may be provided for urging the double-seat valve 47 away from the seat 50.

For operating the double-seat valve 47, there is provided an air pressure-responsive device 55 comprising an evacuated Sylphon diaphragm 56 mounted in a chamber 57 and having a stem 58 which engages the double-seat valve. The chamber 57 has restricted communication with the atmosphere by way of an ambient pressure passage 59, and also communicates with a conduit 60. One branch 60a of the latter is connected to a pressure probe 61 in the inlet 15a of the engine compressor 12, and another branch 60b leads to a pressure probe 62 in the discharge outlet 15b of the compressor. Interposed in the branch conduit 60b is an electro-responsive change-over valve device 64, comprising a normally open valve element 65 which is adapted to be closed during energization of a coil 66.

The speed-responsive control valve device 29 comprises a casing 70 having a bore 71 in which a hollow shaft 72 is rotatably mounted for operation by the engine 10 through the medium of a suitable drive connection. The upper end of the shaft 72 carries a rotary housing 74 in which a pair of flyweights 75 are pivotally mounted. Slidably mounted in a longitudinal bore 76 in the shaft 72 is a valve element 77, the upper end of which carries a collar 78 to which the flyweights 75, during operation of the device, are adapted to apply a component of centrifugal force in opposition to the pressure of a speeder spring 80. The hollow shaft 72 has formed therein an inlet port 82 communicating with the fuel supply pipe 27, a discharge or control port 83 communicating with a control pressure pipe 84 and a by-pass port 85 communicating with the return pipe 43. A land 87 formed on the valve element is adapted to establish and control either a flow communication from the inlet port 82 to the discharge port 83, as during low speed operation, or a communication between the latter and the by-pass port 85, as during operation at maximum speed.

It will be understood that only principal components of this equipment are herewith disclosed and described in elementary diagrammatic form for clearly illustrating the invention, and that other well-known features of construction may be utilized therewith, in actual practice, for ensuring sensitive and accurate operation of the apparatus.

The overspeed control device 30 comprises a cylinder 90 having a bore in which a piston 91 is mounted. The piston 91 is subject on one side of the pressure of fluid in a chamber 92 which communicates with the control pipe 84. The opposite side of the piston is exposed to a chamber 93 communicating with the low pressure or return pipe 43. Extending coaxially of the piston 91 is a rod 95, which operatively connects the piston to the overspeed valve 36. A spring 96 is disposed in engagement with the overspeed valve 36 for urging it toward closed position to the right in opposition to the pressure of fluid in chamber 92, which urges the rod 95 and the valve toward the left, as viewed in Fig. 1 of the drawings.

According to the invention, a speed-responsive switch 100 is provided to control energization of a suitable circuit 101 that is connected in parallel to both the coil 66 of the change-over valve device 64 and the coil 20 of the nozzle actuator device 19. The switch 100 comprises a stationary contact element 102, and a movable contact element 103 that is operatively connected to the rod 95. The switch 100 is adapted to be closed for maintaining the circuit 101 energized so long as the engine speed is below a predetermined maximum value, as measured by the speed-responsive control valve device 29.

Figure 3:
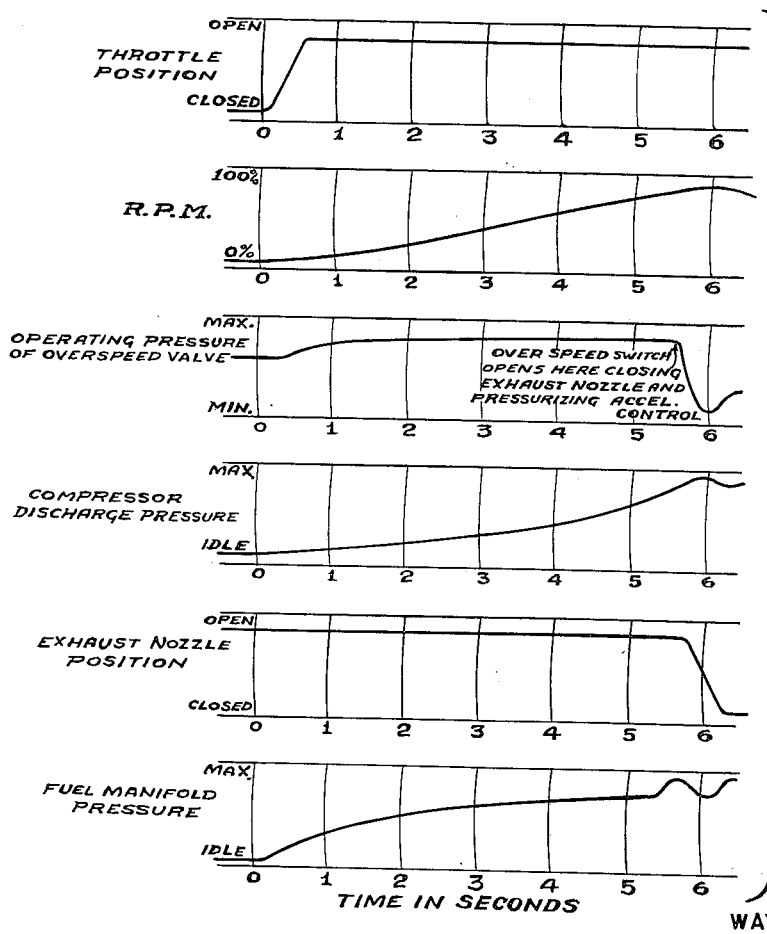
Fig. 3 is a series of related curves copied from an oscillographic recording made during a test of apparatus embodying the invention.

In initial stages of an operation to effect acceleration of the engine from a speed below full speed, the flyweights 75 of the speed-responsive control valve device 29 are disposed to hold the valve 87 open, as shown in Fig. 1, so that the pressure of fuel supplied from the pump apparatus 25 is applied to the piston 91 to hold the switch 100 closed and the overspeed valve 36 open. With the circuit 101 thus energized, the coil 20 is at the same time energized to hold the nozzle apparatus 14 open, while the coil 66 is energized to maintain the change-over valve 65 in closed position. Consequently, the relatively low pressure of air in the compressor inlet 15a is applied to the Sylphon diaphragm 56 associated with the pressure-responsive acceleration control valve device 32, so that the double-seat valve 47 is positioned to by-pass some of the fuel supplied to the chamber 46 through the passage 49 to pipe 43. The resultant rate of flow of fuel effected by way of the throttle valve and related communications to the combustion apparatus 13 is thus limited to the low value required during early stages of acceleration in speed. This accelerating operation of the apparatus just described is graphically demonstrated in Fig. 3 of the drawings.

At full speed of the engine, however, the flyweights 75 are moved outwardly to a control position and effect upward movement of the valve 77 so as to partially cut off communication to the control port 83 from the supply pipe 27 for effecting a reduction in the control pressure in the chamber 92 of the overspeed control device 30. The spring 96 then shifts the valve 36, rod 95 and contact element 103 to the right, as viewed in Fig. 1. Upon this movement of the contact element 103 of the switch 100, the circuit 101 is opened and the coils 66 and 20 are deenergized. The actuator device 19 is thereby rendered operative to close the variable area nozzle apparatus 14, for restricting the flow area of the exhaust nozzle 17 of the engine.

At the same time, the valve element 65 of the change-over valve device 64 is operated to establish communication from the probe 62 in the compressor outlet 15b through the branch conduit 60b to the chamber 57, so that the Sylphon diaphragm is subjected to a relatively high pressure for positioning the double-seat valve 47 to effect increased flow of fuel to the combustion apparatus 13. It will be understood that while the overspeed control valve 36 is meanwhile operated to maintain control of the fuel rate subject to engine speed, resetting of the acceleration control device 32, as just explained, results in sufficient increase in available fuel flow to the engine to continue operation thereof at maximum speed, with the engine nozzle closed to establish the desired maximum or "military" thrust, as will be apparent upon reference to Fig. 3.

Figure 2:
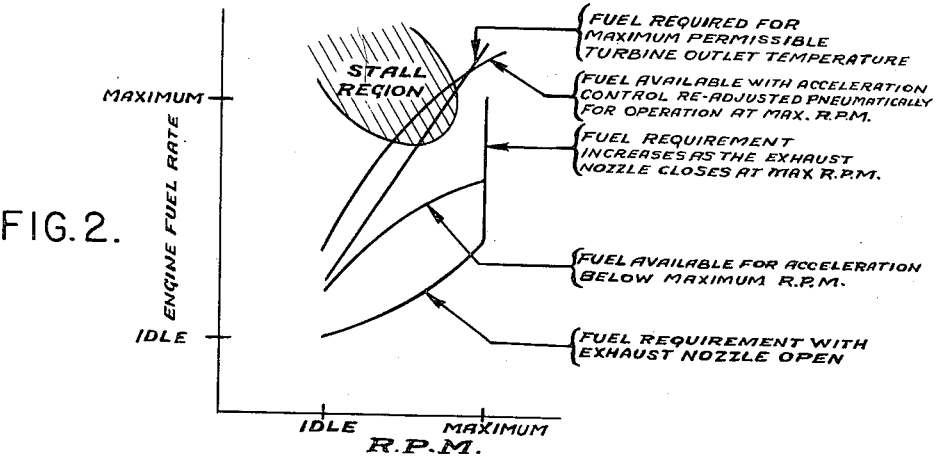
Fig. 2 is a diagram illustrating the relationship of engine speed and fuel rate for a power plant such as that shown in Fig. 1.

It will thus be seen that with the improved acceleration control apparatus constructed in accordance with the invention, acceleration of the turbojet engine may safely be effected to attain the desired speed, fuel rate and nozzle position in a shorter interval of time than has heretofore been possible, without risk of compressor stall, as indicated diagrammatically in Fig. 2 of the drawings.

While the invention has been shown in but one form, it will be obvious to those skilled in the art that it is not so limited, but is susceptible of various changes and modifications without departing from the spirit thereof.

What is claimed is:

1. In a control system for a turbojet engine including a compressor having an inlet and a discharge outlet, combustion apparatus, a turbine for driving the compresor, normally open variable area turbine exhaust nozzle apparatus and a source of fuel under pressure, in combination: a fuel supply communication connecting said fuel source to said combustion apparatus, an acceleration control valve interposed in said communication and operative to limit the available rate of flow therethrough, air pressure-responsive means operatively connected to said acceleration control valve and responsive to an increase in air pressure to cause said valve to establish a higher available rate of fuel flow, conduit means providing communication from the inlet and the outlet of said compressor to said air pressure-responsive means, change-over valve means interposed in said conduit means for effecting application to said pressure-responsive means of only compressor inlet pressure at one time and of compresor discharge pressure at another time, actuating means operatively connected to said variable area turbine exhaust nozzle apparatus and adapted to effect reduction in the flow area thereof, and engine speed-responsive means operatively related to both said change-over valve means and said actuating means and responsive to a predetermined increase in speed of the engine for simultaneously effecting operation of said change-over valve means to transfer control of the pressure-responsive means from compressor inlet pressure to compressor discharge pressure while effecting operation of said actuating means to reduce the nozzle flow area.

2. In a control system for a turbojet engine including a compressor having an inlet and a discharge outlet, a turbine operatively connected to the compressor, combustion means for supplying motive gas to the turbine, a variable area turbine exhaust nozzle, and means for closing said nozzle, in combination: a source of fuel under pressure; a communication through which fuel is conducted from said source to said combustion apparatus; acceleration control valve means interposed in said communication for controlling the flow of fuel therethrough; pressure-responsive means operatively related to said acceleration control valve means for response to a low pressure to provide a low rate of fuel flow and for response to a high pressure to establish a higher rate of available fuel flow; conduit means connecting said pressure-responsive means to said compressor inlet and to said compressor outlet; electro-responsive changeover valve means interposed in said conduit means and operative when energized to close communication between said conduit means and said compressor outlet; electro-responsive actuating mechanism operatively related to said variable area turbine exhaust nozzle and operative when energized to effect opening of said nozzle; a normally energized control circuit connected to said electro-responsive valve means and said electro-responsive actuating mechanism; and engine speed-responsive control switch means interconnected in said circuit; said switch means being normally closed and operative to open said circuit upon attainment of a predetermined engine speed, thereby simultaneously effecting transfer of control of said pressure-responsive means from compressor inlet pressure to compressor outlet pressure while effecting closure of said turbine exhaust nozzle.

3. In a control system for a turbojet engine including a compressor having an inlet and a discharge outlet, a turbine operatively connected to the compressor, and combustion means for supplying motive gas to the turbine, in combination: a fuel pump; means providing a communication from said pump to said combustion means; fuel regulator apparatus including an engine speed-responsive governor and an overspeed valve operative thereby and interposed in said communication for regulating the metering of fuel from said pump to said communication; throttle valve means interposed in said communication and operable to control the flow of fuel therethrough to the combustion means; a by-pass leading from said communication to the inlet of said pump and an acceleration control valve interposed therebetween and in series with said overspeed valve and said throttle valve means for limiting the available flow of fuel by way of said communication to said combustion means; pressure-responsive means for actuating said acceleration control valve and responsive to an increase in pressure to establish a maximum rate of available fuel flow; conduit means adapted to connect said pressure-responsive means selectively to said inlet and to said outlet of said compressor; electro-responsive change-over valve means interposed in said conduit means for closing and opening communication from said compressor outlet; and a control circuit for selectively energizing said electro-responsive valve means including switch means operatively connected to said engine speed-responsive governor, said switch means being responsive to a predetermined increase in engine speed to open the circuit for causing pressure of air in the compressor outlet to be applied to said pressure-responsive means.

4. In a control system for a turbojet engine including a compressor having an inlet and a discharge outlet, a turbine operatively connected to the compressor, and combustion means for supplying motive gas to the turbine, in combination: a fuel pump; means providing a communication from said pump to said combustion means; fuel regulator apparatus including an engine speed-responsive governor and an overspeed valve operative thereby and interposed in said communication for regulating the metering of fuel from said pump to said communication; throttle valve means interposed in said communication and operable to control the flow of fuel therethrough to the combustion means; a by-pass leading from said communication to said pump and an acceleration control valve interposed therebetween in series with said overspeed valve and said throttle valve means for limiting the available flow of fuel by way of said communication to said combustion means; pressure-responsive means for actuating said acceleration control valve and responsive to an increase in pressure to establish a maximum rate of available fuel flow; conduit means adapted to connect said pressure-responsive means selectively to said inlet and to said outlet of said compressor; electro-responsive change-over valve means interposed in said conduit means for closing and opening communication from said outlet; a circuit for energizing and deenergizing said electro-responsive means; and switch means operatively connected to said overspeed valve for selectively controlling said circuit in accordance with engine speed.

5. In a control system for a turbojet engine including a compressor having an inlet and a discharge outlet, a turbine operatively connected to the compressor, and combustion means for supplying motive gas to the turbine, in combination: a fuel pump; means providing a communication from said pump to said combustion means; fuel regulator apparatus including an engine speed-responsive governor and an overspeed valve operative thereby and interposed in said communication for regulating the metering of fuel from said pump to said communication; throttle valve means interposed in said communication and operable to control the flow of fuel therethrough to the combustion means; a by-pass leading from said communication to said pump and an acceleration control valve interposed therebetween in series with said overspeed valve and said throttle valve means for limiting the available flow of fuel by way of said communication to said combustion means; pressure-responsive means for actuating said acceleration control valve and responsive to an increase in pressure to establish a maximum rate of available fuel flow; conduit means adapted to connect said pressure-responsive means selectively to said inlet and to said outlet of said compressor; electro-responsive change-over valve means interposed in said conduit means for closing and opening communication from said outlet; a circuit for energizing the electro-responsive valve means for initially cutting off communication of compressor outlet pressure to said pressure-responsive means; and switch means in said circuit operatively connected to said overspeed valve, said switch means being actuated therewith upon a predetermined increase in engine speed to effect deenergization of said electro-responsive valve means to establish communication from the compressor outlet to said pressure-responsive means and consequently to effect transfer of control of said acceleration control valve from compressor inlet pressure to compressor outlet pressure.

6. Apparatus as set forth in claim 3, further comprising variable area turbine exhaust nozzle means, and electro-responsive actuating mechanism therefor connected to the control circuit and operative when said circuit is opened to effect reduction of the nozzle flow area.

7. Apparatus as set forth in claim 5, further comprising variable area turbine exhaust nozzle means, and electro-responsive actuating mechanism therefor connected to the control circuit and controlled by the switch means, said actuating mechanism being operative when said circuit is deenergized to effect a reduction in nozzle flow area coincident with increase in the available fuel flow rate by the acceleration control valve.

References Cited in the file of this patent

FOREIGN PATENTS

| 941,556 | France | July 19, 1948 |
| 967,703 | France | Apr. 5, 1950 |